(12) United States Patent
Zhang et al.

(10) Patent No.: US 8,887,831 B2
(45) Date of Patent: Nov. 18, 2014

(54) TRANSMISSION FOR POWER TOOL WITH VARIABLE SPEED RATIO

(75) Inventors: Qiang J. Zhang, Lutherville, MD (US); Beverly Matthews, White Hall, MD (US); Sankarshan Murthy, Towson, MD (US)

(73) Assignee: Black & Decker Inc., Newark, DE (US)

( * ) Notice: Subject to any disclaimer, the term of this patent is extended or adjusted under 35 U.S.C. 154(b) by 315 days.

(21) Appl. No.: 13/298,967

(22) Filed: Nov. 17, 2011

(65) Prior Publication Data

US 2013/0126201 A1 May 23, 2013

(51) Int. Cl.
| | |
|---|---|
| F16H 35/02 | (2006.01) |
| B25F 5/00 | (2006.01) |
| B23B 45/00 | (2006.01) |
| F16H 27/06 | (2006.01) |
| B23B 39/00 | (2006.01) |

(52) U.S. Cl.
CPC ............. B23B 45/008 (2013.01); B25F 5/001 (2013.01); F16H 35/02 (2013.01); F16H 27/06 (2013.01); *B23B 2260/076* (2013.01); B23B 39/00 (2013.01); *B23B 2260/07* (2013.01)
USPC .................. 173/216; 74/393; 74/437; 173/47

(58) Field of Classification Search
CPC ..... B25F 5/00; F16H 35/02; F16H 2035/001; F16H 2035/003
USPC .................... 173/216, 217, 47, 170; 475/331; 74/393, 44, 437
See application file for complete search history.

(56) References Cited

U.S. PATENT DOCUMENTS

| | | | | |
|---|---|---|---|---|
| 1,449,845 | A | * | 3/1923 | Taylor .............................. 74/437 |
| 2,167,320 | A | | 7/1939 | Yabe |
| 2,700,285 | A | * | 1/1955 | Bellini ............................. 66/208 |
| 3,823,617 | A | * | 7/1974 | Infanger et al. ................. 74/498 |
| 3,826,152 | A | * | 7/1974 | Alexeev et al. ............... 74/424.5 |
| 3,919,895 | A | * | 11/1975 | Kerr ................................. 475/16 |
| 3,979,966 | A | * | 9/1976 | Kotte .............................. 74/436 |
| 4,042,087 | A | | 8/1977 | Itin et al. |
| 4,211,291 | A | | 7/1980 | Kellner |
| 5,111,707 | A | * | 5/1992 | Sugiyama ........................ 74/7 E |
| 5,692,986 | A | * | 12/1997 | Long et al. ...................... 475/14 |
| 5,954,144 | A | * | 9/1999 | Thames ........................ 173/216 |
| 6,021,683 | A | * | 2/2000 | Doege et al. ...................... 74/44 |
| 6,289,754 | B1 | * | 9/2001 | Doege et al. ...................... 74/44 |
| 7,328,752 | B2 | * | 2/2008 | Gass et al. .......................... 173/2 |
| 7,743,683 | B2 | | 6/2010 | Dayton et al. |
| 8,043,193 | B2 | * | 10/2011 | Pohl ............................... 475/331 |
| 8,381,831 | B2 | * | 2/2013 | Sekino et al. ................... 173/48 |
| 8,460,153 | B2 | * | 6/2013 | Rudolph et al. .............. 475/290 |

(Continued)

*Primary Examiner* — Andrew M Tecco

(74) *Attorney, Agent, or Firm* — Scott B. Markow

(57) ABSTRACT

A power tool includes a housing, a motor contained in the housing, an output shaft extending proximate a front of the housing, an end effector coupled to the output shaft and configured to hold an accessory; and a transmission disposed in the housing between the motor and the output shaft. The transmission includes a variable ratio gear set configured to transmit power from the motor to the output shaft at a substantially variable speed ratio. The transmission may further include a constant ratio gear set configured to transmit power from the motor at a substantially constant speed ratio. The transmission may be automatically or manually shiftable between a first mode where it transmits power through the constant speed ratio gear set and a second mode where it transmits power through the variable speed ratio gear set.

17 Claims, 19 Drawing Sheets

(56) References Cited

U.S. PATENT DOCUMENTS

| | | | |
|---|---|---|---|
| 8,574,115 B2 * | 11/2013 | Atsumi et al. | 475/299 |
| 8,651,199 B2 * | 2/2014 | Ho | 173/176 |
| 2006/0225690 A1 * | 10/2006 | Arov | 123/198 F |
| 2009/0071673 A1 * | 3/2009 | Zhong et al. | 173/216 |
| 2010/0186978 A1 | 7/2010 | Sekino et al. | |
| 2012/0067607 A1 * | 3/2012 | Weber et al. | 173/216 |

* cited by examiner

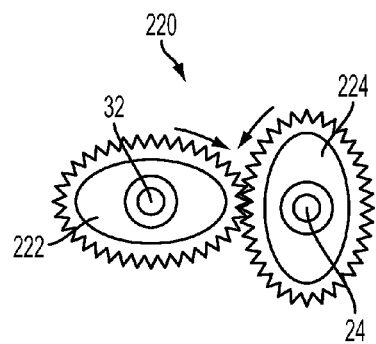
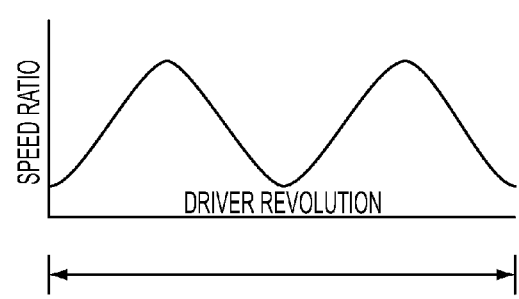
FIG. 11A  FIG. 11B
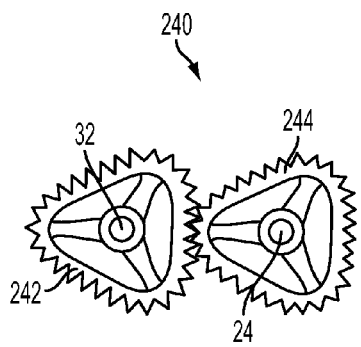
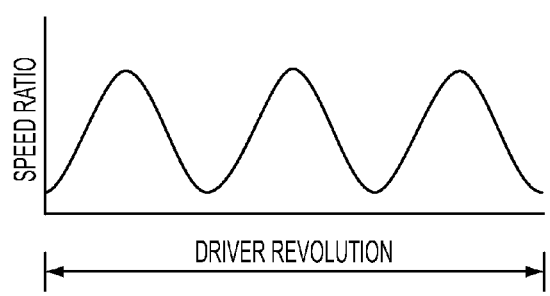
FIG. 12A  FIG. 12B

US 8,887,831 B2

TRANSMISSION FOR POWER TOOL WITH VARIABLE SPEED RATIO

TECHNICAL FIELD

This application relates to a transmission for a power tool, such as a drill/driver, that provides a variable speed ratio between the input speed of a motor and an output speed of the tool in at least one mode of operation.

BACKGROUND

A power tool, such as a drill/driver, generally has a transmission to transmit power from a motor to an output shaft of the tool. Such a transmission often functions to reduce the speed and increase the torque from the motor. This type of transmission generally operates at a constant speed ratio, meaning that the ratio between the speed of the output shaft and the motor remains generally constant. For example, the transmission may rotate the output shaft at 0.25 times the output speed of the motor. Examples of such a transmission include a parallel axis transmission with spur gears, and a planetary transmission with planetary gears.

Certain other power tools, such as impact drivers or impact wrenches, may additionally include a hammering mechanism known as a Pott mechanism disposed between the transmission or motor and the output shaft. Versions of a Pott mechanism are described, for example, in U.S. Pat. Nos. 2,012,916 and 2,160,150, each of which is incorporated by reference. Generally, a Pott mechanism is coupled to the output of a planetary gear transmission and includes a spring biased hammer that rides along V-shaped grooves in an anvil. The hammer applies a rotational hammering force to the output shaft when a certain threshold of torque is encountered by the output shaft. Thus, when hammering, the Pott mechanism applies rotational blows to the rotating output shaft to assist in driving fasteners through hard joints and inhibiting screw-driving bits from slipping out of the heads of screws (known as "cam-out"). However, the Pott hammering mechanism tends to be very noisy and causes a great deal of vibration.

SUMMARY

For many applications, especially lighter duty applications, it would be desirable to have a variable speed ratio or intermittent output of a power tool without the noise and vibration associated with a traditional Pott mechanism. It would also be desirable to have a power tool that can operate in one mode with a constant speed ratio output when the torque encountered by the tool is relatively low and in a second mode with a variable speed ratio mode at higher torque levels.

In one aspect, a power tool includes a housing, a motor contained in the housing, an output shaft extending proximate a front of the housing, an end effector coupled to the output shaft and configured to hold an accessory; and a transmission disposed in the housing between the motor and the output shaft. The transmission includes a variable ratio gear set configured to transmit power from the motor to the output shaft at a substantially variable speed ratio. Implementations of this aspect may include one or more of the following features.

The transmission may further include a constant ratio gear set configured to transmit power from the motor. The constant ratio gear set may include circular gears. For example, the circular gears may include a first circular gear that receives rotational output of the motor and a second circular gear non-rotationally couplable to the output shaft, the first circular gear meshing with the second circular gear. Alternatively, the circular gears may include a planetary gear set with a sun gear that receives rotational output of the motor, a planet gear that orbits the sun gear, and a stationary ring gear surrounding the planet gear, and a carrier that carries the planet gear and that is non-rotationally couplable to the output shaft.

The variable ratio gear set may include a Geneva gear set or non-circular gears. Alternatively, the variable ratio gear set may include a carrier that receives rotational output of the motor, a planet gear coupled to the carrier, a stationary ring gear surrounding the planet gear, an eccentric pin coupled to the planet gear, and a radial yoke that receives the pin for radial movement relative to the yoke, the yoke non-rotationally couplable to the output shaft, such that when the carrier rotates on its axis, the planet gear moves in an orbital motion and rotates about its axis while the eccentric pin moves radially back and forth in the yoke, causing the yoke to rotate at a variable speed ratio relative to the carrier. In another alternative, the variable ratio gear set may include a sun gear that receives rotational output of the motor, an input planet gear meshed with the sun gear, an output planet gear non-rotationally coupled to the input planet gear, a carrier that carries the output planet gear and that is non-rotationally coupled to the output shaft, and a stationary ring gear, wherein the output planet gear has a reduced number of teeth that engage the ring gear, such that constant rotational motion of the sun gear causes constant rotational motion of the input planet gear and the output planet gear, which causes intermittent rotational motion of the carrier.

The transmission may be operable in a first mode where power is transmitted from the motor to the output shaft through the constant ratio gear set, bypassing the variable ratio gear set, at the substantially constant speed ratio, or a second mode where power is transmitted from the motor to the output shaft through the variable ratio gear set, bypassing the constant ratio gear set, at the substantially variable speed ratio, the transmission being selectively operable in either the first mode or the second mode.

The transmission may be automatically shiftable between the first mode and the second mode. For example, the output shaft may include splines and be moveable axially between a first position in the first mode where at least a portion of the splines rotationally connect the constant ratio gear set to the output shaft and the splines do not rotationally connect the variable ratio gear set to the output shaft, and a second position in the second mode where at least a portion of the splines rotationally connect the variable ratio gear set to the output shaft and the splines do not rotationally connect the constant ratio gear set to the output shaft, the output shaft being biased toward the first position and automatically shifting axially to the second position when output torque exceeds a predetermined value.

The transmission also may be manually shiftable by a user between the first mode and the second mode. For example, the transmission may include a shifting element that shifts at least one component of the constant ratio gear set between an active position in the first mode and an inactive position in the second mode, and/or shifts at least one component of the variable ratio gear set between an active position in the second mode and an inactive position in the first mode.

In another aspect, a transmission for transmitting power at a variable speed ratio includes an input and an output, a carrier non-rotationally coupled to the input, a planet gear rotationally coupled to the carrier, the planetary gear having external teeth and an axially extending eccentric pin, a stationary ring gear generally surrounding the planetary gear, having internal teeth that mesh with the external teeth of the planet gear, and a yoke non-rotationally fixed to and extending radially outward from the output, the yoke receiving the eccentric pin. When the input rotates, the planet carrier rotates, and the planet gear moves in an orbital motion and rotates about its axis, and the eccentric pin moves radially back and forth in the yoke, causing the yoke and the output to rotate at a variable speed ratio relative to the speed of the input shaft.

In another aspect, a transmission for transmitting power at a variable speed ratio includes an input and an output, a sun gear non-rotationally coupled to the input, an input planet gear meshed with the sun gear, an output planet gear non-rotationally coupled to the input planet gear, an output carrier to which the output planet gear is pinned; and a stationary ring gear. The output planet gear has a reduced number of teeth that engage the ring gear, such that when the input rotates, the sun gear rotates, causing the input planet gear and the output planet gear to rotate, and the reduced number of teeth of the output planet gear intermittently engage the teeth of the ring gear to cause intermittent rotational motion of the carrier and the output. In one exemplary embodiment, the output planet gear has only a pair of diametrically opposed teeth.

Advantages may include one or more of the following. The disclosed transmissions provide for a variable speed ratio output using gears instead of a Pott mechanism, which reduces or eliminates strong hammering impacts and the associated noise and vibration. The transmissions also are able to run at a constant speed ratio when the torque encountered by the tool is relatively low and then be automatically or manually shiftable to a variable speed ratio at higher torque levels. Several of the disclosed variable speed ratio transmission gear sets are also novel in their own right, providing for punctuated or continuous variable speed ratio transmission of power. These and other advantages and features will be apparent from the description, the drawings, and the claims.

BRIEF DESCRIPTION OF THE DRAWINGS

FIG. 11A is a side view of another embodiment of variable speed ratio gear set having non-circular gears for use with the transmission of FIG. 2.

FIG. 11B is a graph illustrating the speed ratio output of the gear set of FIG. 11A.

FIG. 12A is a side view of another embodiment of variable speed ratio gear set having non-circular gears for use with the transmission of FIG. 2.

FIG. 12B is a graph illustrating the speed ratio output of the gear set of FIG. 12A.

DETAILED DESCRIPTION

Figure 1:
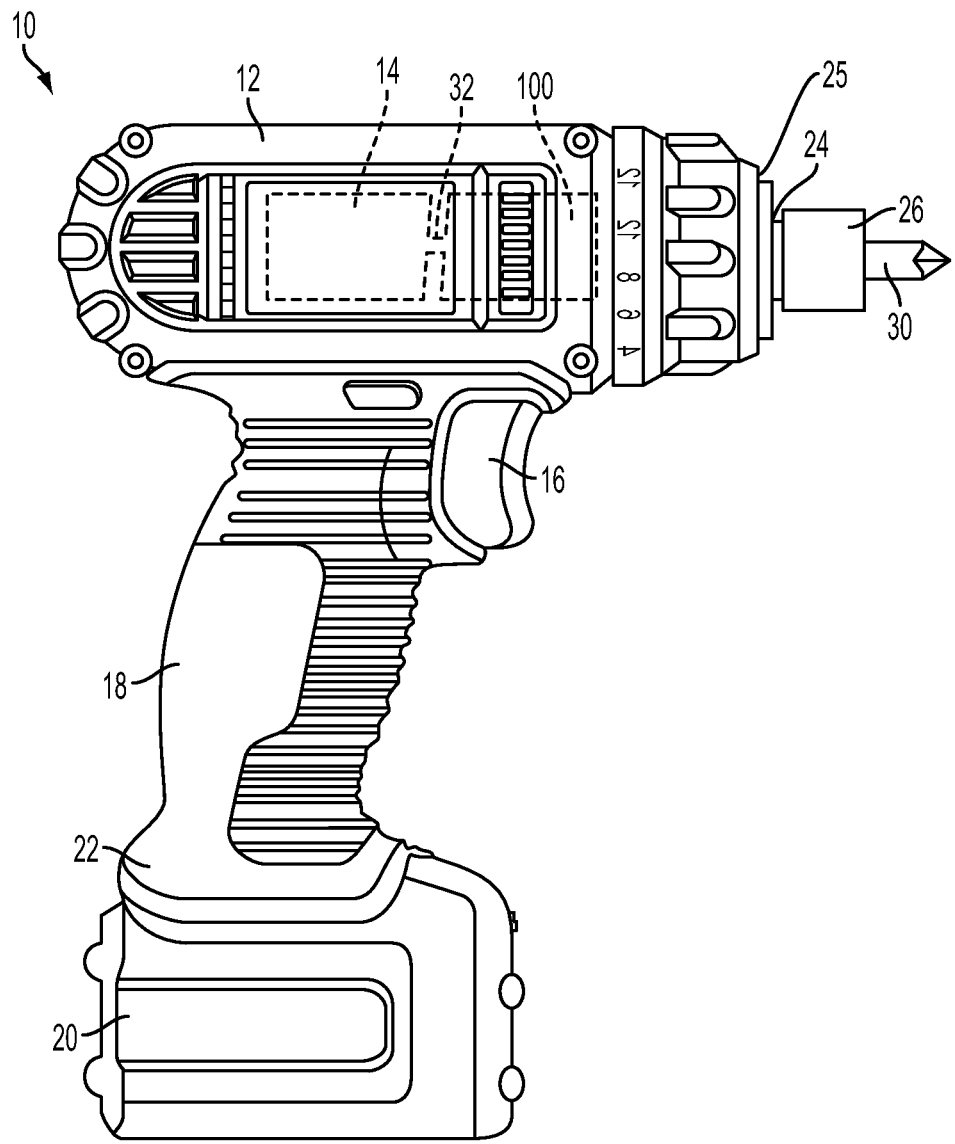
FIG. 1 is a side view of an embodiment of a power tool.
Figure 2:
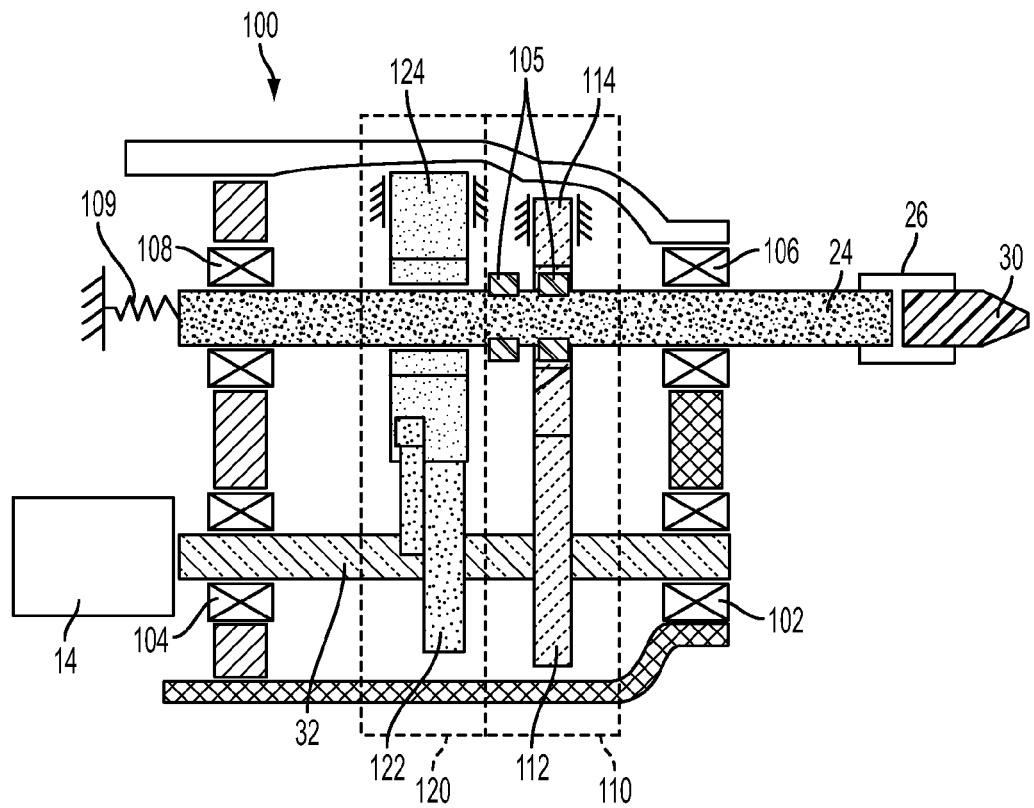
FIG. 2 is a schematic diagram of a first embodiment of a transmission with a constant speed ratio gear set and a variable speed ratio gear set, in a constant speed ratio mode of operation.

FIG. 1 illustrates a power tool, e.g., a power drill/driver 10, having a housing 12, a motor 14 contained in the housing 12, and a switch 16 (e.g., a variable speed trigger) coupled to the housing for selectively actuating and controlling the speed of the motor 14. Extending downward from the housing 12 is a handle 18 with a battery 20 or other source of power (e.g., alternating current cord or compressed air source) coupled to a distal end 22 of the handle 18. An output shaft 24 is proximate a front end 25 of the housing 12 and is coupled to an end effector 26 for holding a power tool accessory, e.g., a tool bit 30 such as a drill bit or a screwdriver bit. In the illustrated example of FIG. 1, the end effector 26 is a quick release tool bit holder, although it should be understood that the end effector can have other configurations such as a chuck. An input shaft 32 extends from the motor 14 to a transmission 100 that transmits power from the input shaft 32 to the output shaft 24 and to the end effector 26.

FIGS. 2-5 schematically illustrate an embodiment of the transmission 100. The input shaft 32 is rotationally fixed to the output of the motor 14. The input shaft 32 is supported by a front bearing 102 and a rear bearing 104, and is coupled to a first gear set 110 and a second gear set 120. The output shaft 24 is rotationally fixed to the end effector 26, supported by a front bearing 106 and a rear bearing 108, and coupled to the first gear set 110 and a second gear set 120. The input shaft 32 and the output shaft 24 are parallel to and offset from one another. The output shaft 24 is moveable axially between a forward position (shown in FIG. 2) and a rearward position (shown in FIG. 4), and is biased, e.g., by a spring 109, toward the forward position. The output shaft 24 also has external splines 105 that engage the first gear set 110 when the output shaft 24 is in the forward position, and engage the second gear set 120 when the output shaft is in the rearward position.

Figure 3:
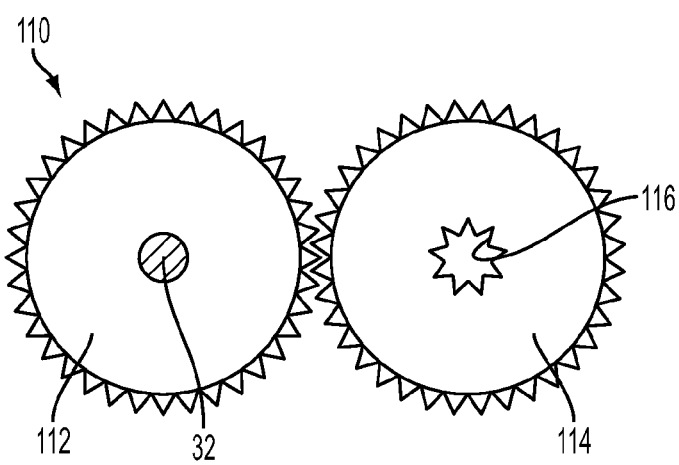
FIG. 3 is a front view of a constant speed ratio gear set of the transmission of FIG. 2.
Figure 4:
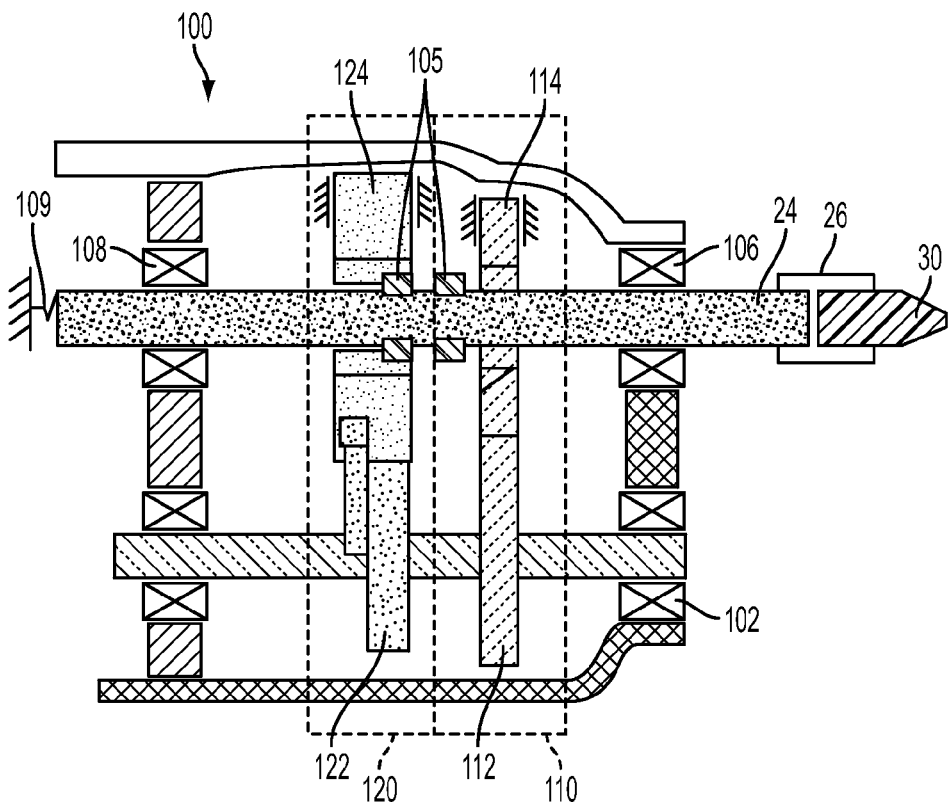
FIG. 4 is a schematic diagram of transmission of FIG. 2 in a variable speed ratio mode of operation.

Referring to FIG. 3, the first gear set 110 comprises an input circular spur gear 112 that is press fit or otherwise rotationally fixed to the input shaft. An output circular spur gear 114 meshes with the input spur gear 112. The output spur gear 114 has an internally splined central bore 116 that engages with the external splines 105 of the output shaft 24 when the output shaft 24 is in the forward position. Thus, when the output shaft 24 is in the forward position, power is transmitted from the motor 14, to the input shaft 32, to the input spur gear 112, to the output spur gear 114, to the output shaft 24, bypassing the second gear set 120. Because the spur gears 112, 114 are circular, power is a transmitted at a substantially constant angular velocity ratio, meaning that the rotational speed of the output shaft 24 at a substantially constant ratio relative to the rotational speed of the input shaft 32.

Figure 5:
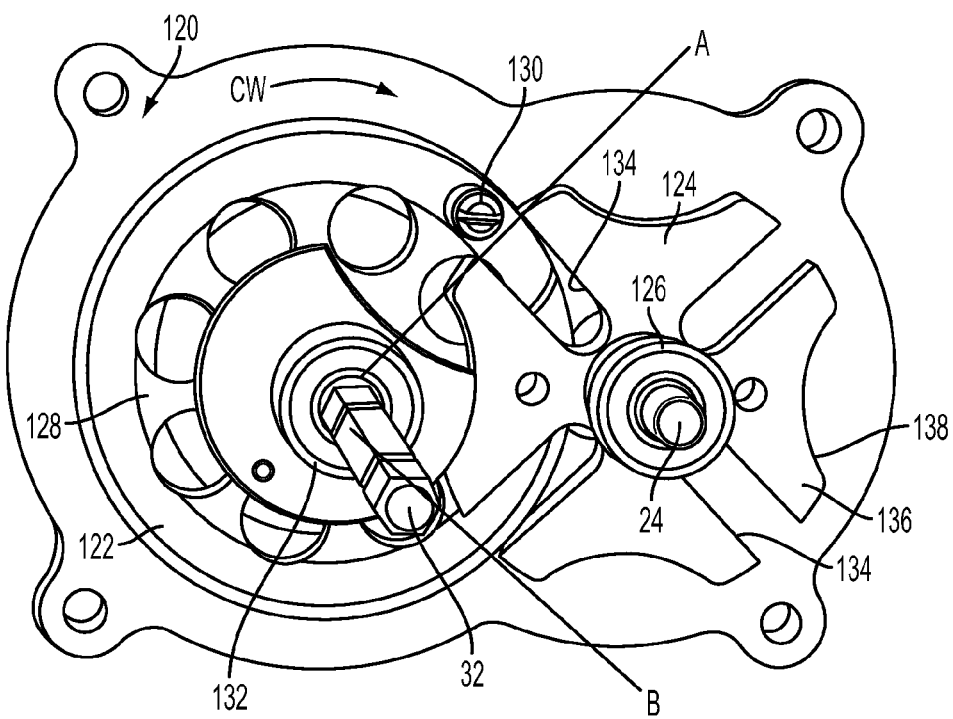
FIGS. 5-9 are front views of a variable speed ratio Geneva gear set for use with the transmission of FIG. 2.
Figure 6:
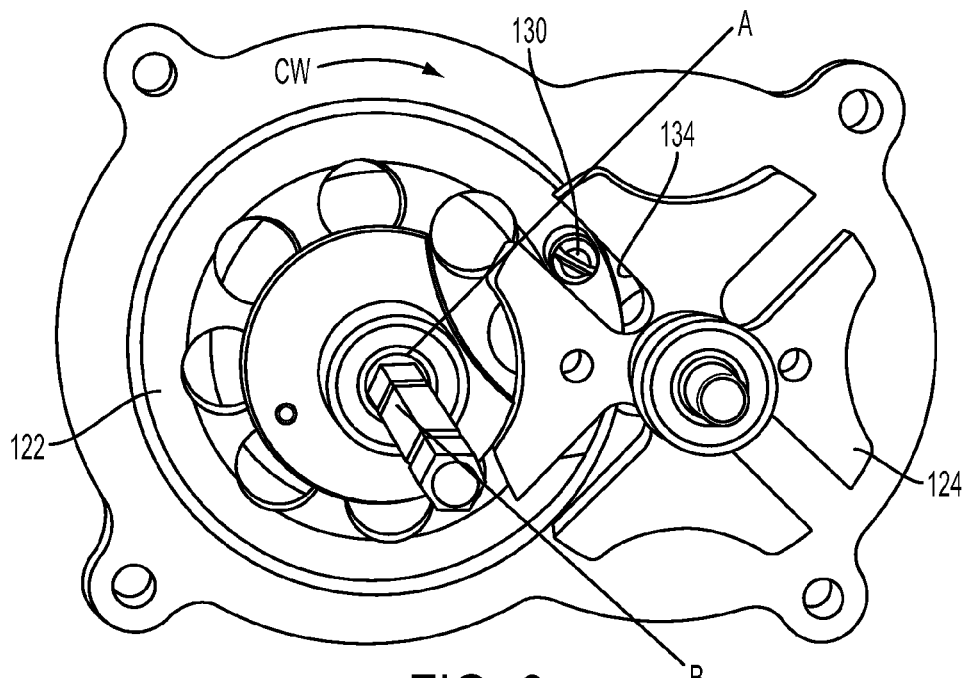
Figure 7:
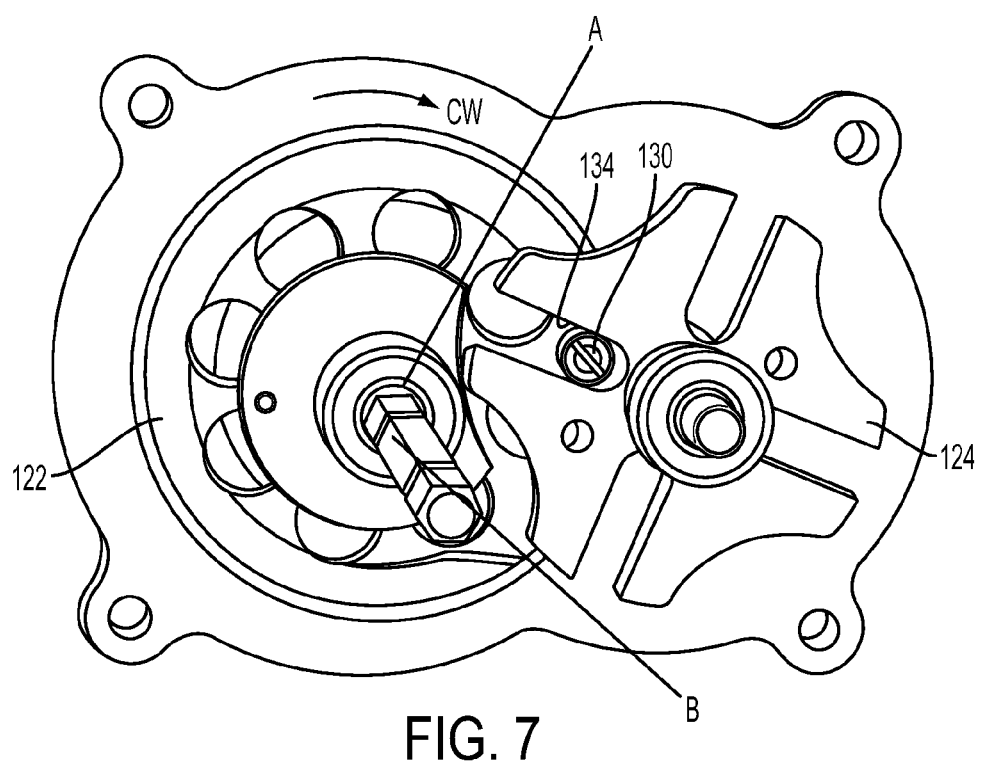
Figure 8:
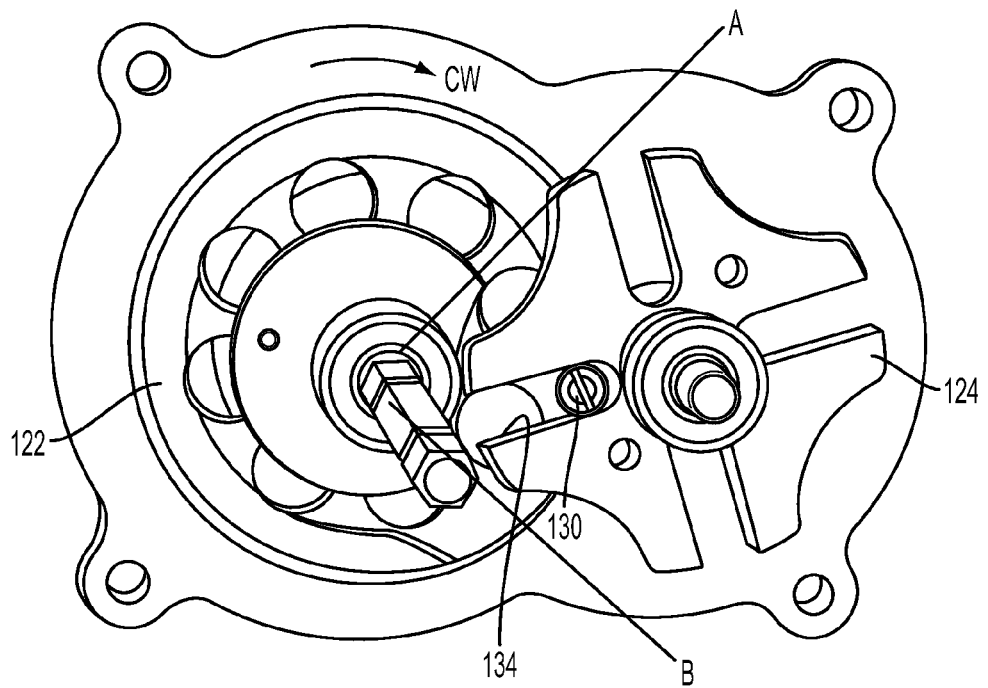
Figure 9:
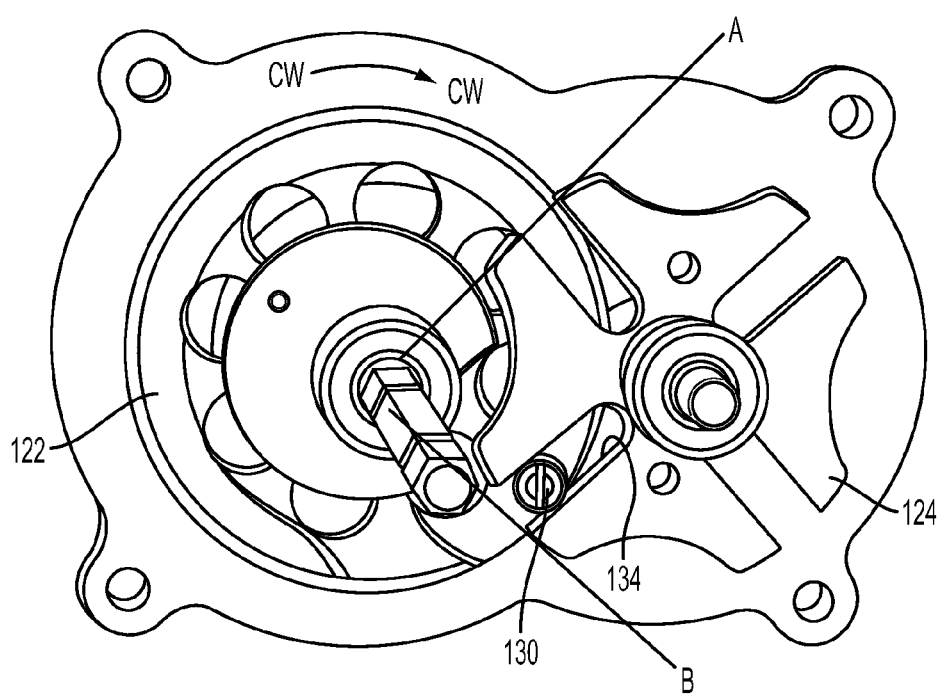

Referring to FIG. 5, the second gear set 120 is a Geneva gear set, having an input Geneva gear 122 press fit or otherwise rotationally fixed to the input shaft 32, and an output Geneva gear 124 that meshes with the input Geneva gear 122. The output Geneva gear 124 has an internally splined central bore 126 that engages with the external splines 105 of the output shaft 24 when the output shaft 24 is in the rearward position. Thus, when the output shaft 24 is in the rearward position, power is transmitted from the motor 14 to the input shaft 110, to the input Geneva gear 122, to the output Geneva gear 124, to the output shaft 24, bypassing the first gear set 110.

The input Geneva gear 122 of the Geneva gear set includes a generally circular disk 128 with an eccentrically mounted axial pin 130 mounted adjacent the periphery of the disk 128, and a convex projection 132 mounted adjacent the center of the disk 128. The output Geneva gear 124 is shaped like a Maltese cross with a plurality of radial slots 134 disposed between a plurality of radial arms 136, each having a concave end portion 138. The concave projection 132 rides against the convex end portions 138, while the axial pin 130 is configured to engage one of the radial slots 134.

Referring to FIGS. 5-9, when the axial pin 130 on the input Geneva gear 122 rotates in a clockwise direction CW between from radial line A to radial line B (subtending an angle of approximately 90 degrees), the axial pin 130 engages one of the slots 134, causing the output Geneva gear 124 to also rotate by approximately 90 degrees. When the axial pin 130 on the input Geneva gear 122 continues to rotate in a clockwise direction CW from radial line B to radial line A (subtending an angle of approximately 270 degrees), the axial pin 130 does not engage any of the slot 134, and the output Geneva gear 124 does not rotate. Thus, for each full rotation of the input Geneva gear 122, the output Geneva gear 124 rotates by approximately 90 degrees, and does so only intermittently during 90 degrees of the input Geneva gear 122 rotation. In other words, the Geneva gear set 120 provides for variable speed or discontinuous rotation of the output shaft 24 relative to rotation the input shaft 32.

Figure 10:
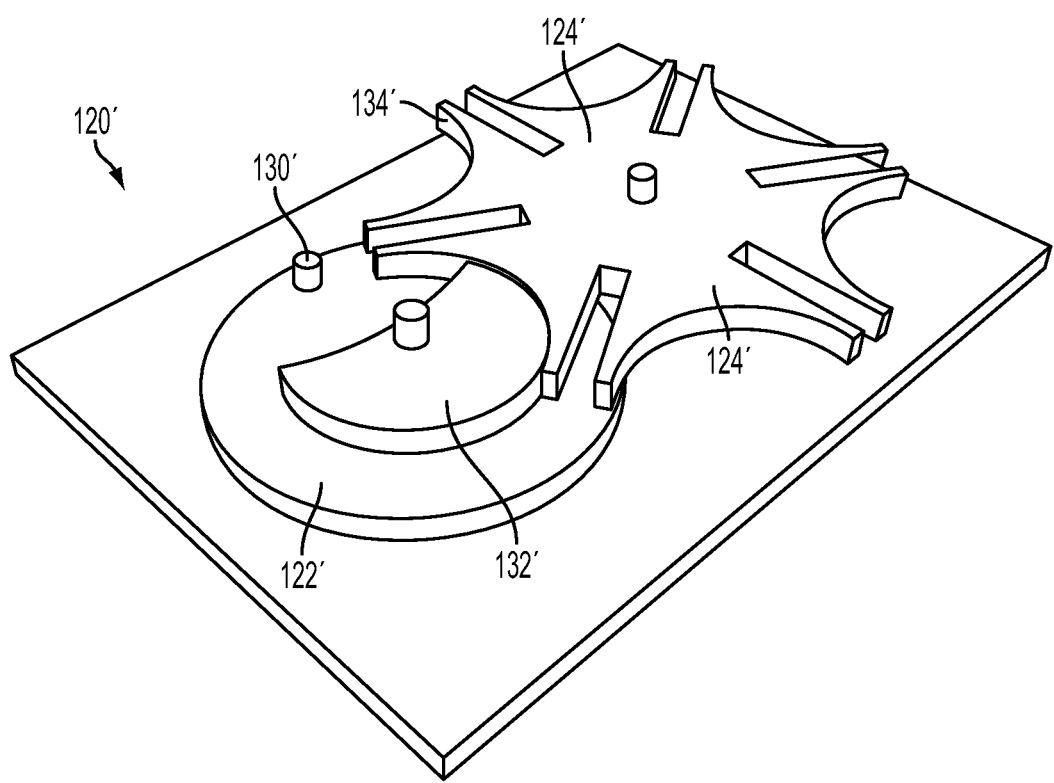
FIG. 10 is a perspective, schematic view of another embodiment of a variable speed ratio Geneva gear set for use with the transmission of FIG. 2.

The Geneva gear set can be designed to alter the frequency and/or magnitude of the rotations of the output Geneva gear relative to the input Geneva gear. For example, FIG. 10 illustrates an alternative Geneva gear set 120' having an input gear 122' with an eccentrically mounted axial pin 124' and a convex projection 134', and an output gear 124' with a plurality of radial slots 134' and radial arms 124'. The Geneva gear set 120' differs from the Geneva gear set 120 in that the output gear 134' has six radial slots, such that the output gear 134' rotates by 60° for each rotation of the input gear 122'. The number of slots could be changed to any other number (n) where each rotation of the input gear will rotate the output gear by 360°/n. In another alternative, one or more additional axial pins could be added to the input gear to provide for more frequent rotations of the output gear relative to the input gear.

In use, the user actuates the trigger 16 to deliver power from the battery 20 to the motor 14 causing the motor 14 to rotate the input shaft 32 at a speed determined by the variable speed trigger 16 position. When the torque encountered by the output shaft is relatively low (e.g., when initially driving a fastener into a workpiece), power is transmitted from the input shaft to the output shaft 24 via the first gear set 110 such that the speed ratio between the motor 14 and the output shaft 24 is relatively constant. When the torque encountered by the output shaft 24 increases to a exceed predetermined threshold value, the output shaft 24 overcomes the bias of spring 109 and moves rearward to disengage from the first gear set 110 and to engage the second gear set 120. The power is now transmitted from the input shaft 32 to the output shaft 24 through the second Geneva gear set 120 so that the output shaft 24 rotates intermittently, or at a variable speed ratio, relative to the speed of the input shaft 32. In this manner, the drill/driver can seat a fastener with a reduced risk of cam-out, and without the noise and vibration associated with a traditional hammer mechanism.

In alternative embodiments, the transmission can be manually shifted between the first (constant) speed ratio mode of operation and the second (variable) speed ratio mode of operation. For example, a switch and/or linkage can be used to shift the output shaft 24 between the forward position and the rearward position. Alternatively, the output shaft can be press fit to both the first gear set and the second gear set, and a switch and/or linkage can selectively shift the gears of the first gear set and the gears of the second gear set into and out of engagement with one another depending on the desired mode of operation.

The Geneva gear sets 120 and 120' described above provide for punctuated, discontinuous rotational motion of the output shaft in the variable speed ratio mode of operation. In alternative embodiments, the Geneva gear set 120, 120' can be replaced by other gear sets that provide for a continuous variable speed ratio between the output shaft and the input shaft.

For example, FIG. 11A and FIG. 12A illustrate alternative embodiments where the Geneva gear set 120 has been replaced by non-circular gear sets. FIG. 11A illustrates an elliptical gear set 220 with an elliptical input gear 222 mounted to the input shaft 32, and an elliptical output gear 224 selectively mounted to the output shaft 24. As shown in FIG. 11B, for each revolution of the input shaft 24, the speed ratio between the output shaft 24 and the input shaft 32 varies in a wave-like pattern, but with the output speed never becoming zero. FIG. 12A illustrates a triangular gear set 240 with a triangular input gear 242 mounted to the input shaft 32, and a triangular output gear 244 selectively mounted to the output shaft 24. As shown in FIG. 12B, for each revolution of the input shaft 24, the speed ratio between the output shaft 24 and the input shaft 32 varies in a wave-like pattern, but with the output speed never becoming zero. Other types of non-circular gear sets that provide for a variable speed ratio could be substituted, such as square gears, cam gears, and other types of multispeed gears.

Figure 13A:
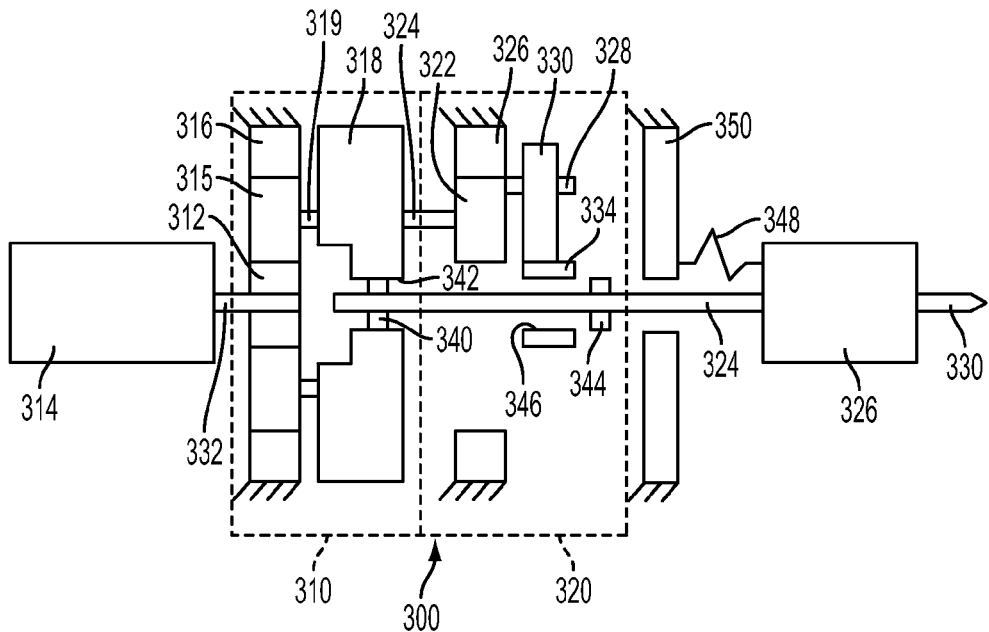
FIG. 13A is a schematic diagram of another embodiment of a transmission with a constant speed ratio gear set and a variable speed ratio gear set, in a constant speed ratio mode of operation.
Figure 13B:
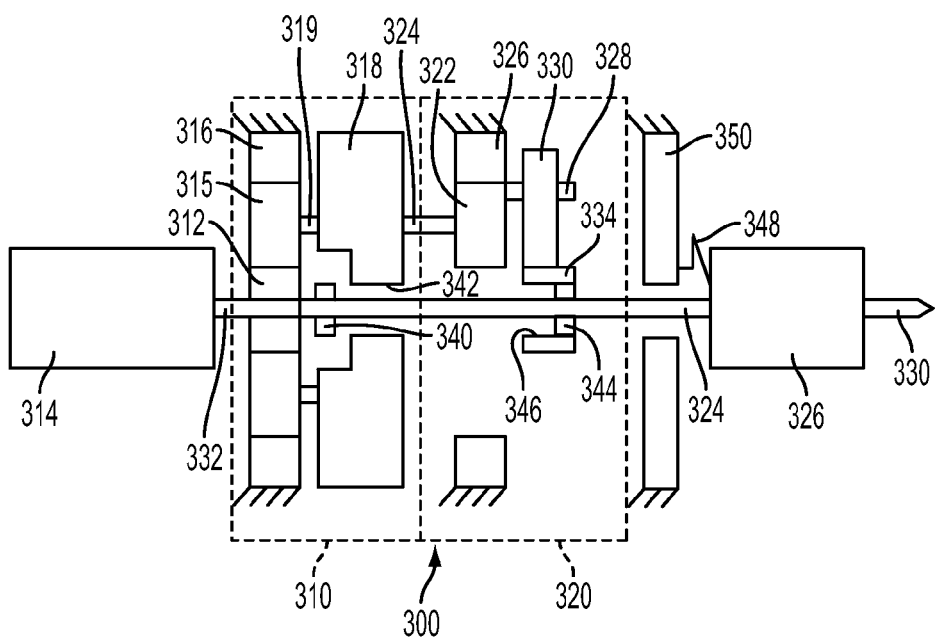
FIG. 13B is a schematic diagram of transmission of FIG. 13A, in a variable speed ratio mode of operation.

FIGS. 13A and 13B schematically illustrate another alternative embodiment of a transmission 300 that selectively couple a motor 314 to an output shaft 324 with an end effector 326 and tool bit 330, similar to the motor 14, output shaft 24, end effector 26, and tool bit 30 described above. Like the transmission 100 described above, the transmission 300 includes an input shaft 332 coupled to the motor, a first gear set 310 that, when active, transmits power from the input shaft 332 to the output shaft 324 at a substantially constant speed ratio, and a second gear set 320 that, when active, transmits power from the input shaft 332 to the output shaft 324 at a variable speed ratio.

The first gear set 310 comprises a single-stage planetary gear transmission having a sun gear 312 press fit on the input shaft 332, a plurality of planetary gears 315 that orbit the sun gear 312, and a stationary ring gear 316 that is fixed to the tool housing against rotation. The planetary gears 315 are pinned to a planet carrier 318 by a plurality of pins 319. When the motor 314 rotates, the input shaft 332 causes the sun gear 312 to rotate about its axis, which in turn causes the planet gears 315 to orbit around the sun gear 314, which causes the planet carrier 318 to rotate about its axis. The rotational speed of the planetary carrier 318 is generally less than the rotational speed of the input shaft 332 with the ratio between their speeds remaining substantially constant. Thus, the first gear set 310, when active, provides a substantially constant speed ratio between the output speed and the input speed. It should be understood that the first gear set 310 can have a variety of other configurations including, for example, a multi-stage planetary transmission, a planetary transmission with stationary planet gears and a rotating ring gear, or a spur gear transmission.

Referring also to FIGS. 14A-14D, the second gear set 320 comprises a planetary gear 322 that is pinned to the opposite side of the carrier 318 by a pin 324, and a stationary ring gear 326 that is rotationally fixed to the housing. Extending from the planetary ring gear is an eccentric pin 328. The eccentric pin 328 is slidably received in a yoke 330 that extends radially outwardly from an output cylinder 334. When the planet carrier 318 rotates, the planet gear 322 orbits inside of the ring gear 326, causing the eccentric pin 328 to move in a pattern that is both radially inward and outward and circumferential relative to the yoke 330. As illustrated in FIGS. 14A-14D, this movement causes the yoke 330, and thus the output cylinder 334 to rotate at a variable velocity ratio relative to the input velocity of the input carrier 318, and relative to the motor 314. As illustrated in the graphs above each of FIGS. 14A-14-D the ratio of the output speed to the input speed peaks when the eccentric pin 328 is at its most radial inward position, and reaches a trough of close to zero when the eccentric pin 328 is at its most radial outward position. Thus, the second gear set 320, when active, provides a variable speed ratio of the output speed to the input speed.

The output shaft 324 has a first set of splines 340 that can selectively engage a splined inner bore 342 in the planet carrier 318 of the first gear set 310. The output shaft 324 also has a second set of spines 344 that selectively engage the a splined inner bore 346 in the output cylinder 330. The output shaft 324 is additionally coupled to the tool housing 350 by a spring 348 that biases the output shaft 324 in a forward direction so that the first set of splines 340 are engaged with the splined bore 342 in the planet carrier 318 (FIG. 13A). When the output shaft 324 encounters sufficient torque resistance to overcome the bias of spring 348, the output shaft 324 moves rearwardly so that the first set of splines 342 no longer engages the splines bore 342 of the planet carrier 318, and the second set of splines 344 engages the splines inner bore 346 of the output cylinder 330 (FIG. 13B).

In use, when power is initially delivered to the motor 314 and the torque encountered by the output shaft 324 is relatively low (e.g., when initially driving a fastener into a workpiece), the first set of spines 342 engage the carrier 318, and power is transmitted from the input shaft 332 to the output shaft 324 via the first gear set 310, bypassing the second gear set 320, such that the speed ratio between the output shaft 324 and the motor 314 is relatively constant. When the torque encountered by the output shaft increases to exceed a predetermined threshold value, the output shaft 324 overcomes the bias of spring 348 and moves rearward to disengage from the first gear set 310 and to engage the second gear set 320. The power is now transmitted from the motor 314 to the output shaft 324 through the second gear set 320, bypassing the first gear set, so that the output shaft 324 rotates at a variable speed ratio relative to the motor 314. In this variable speed ratio mode of operation, the drill/driver can seat a fastener with a reduced risk of cam-out, and without the noise and vibration associated with a traditional hammer mechanism. Other types of automatic shifting mechanisms could be used, such as, for example, a clutch that automatically shifts the transmission based upon the output torque of the tool, as will be apparent to one of ordinary skill in the art.

Figure 14A:
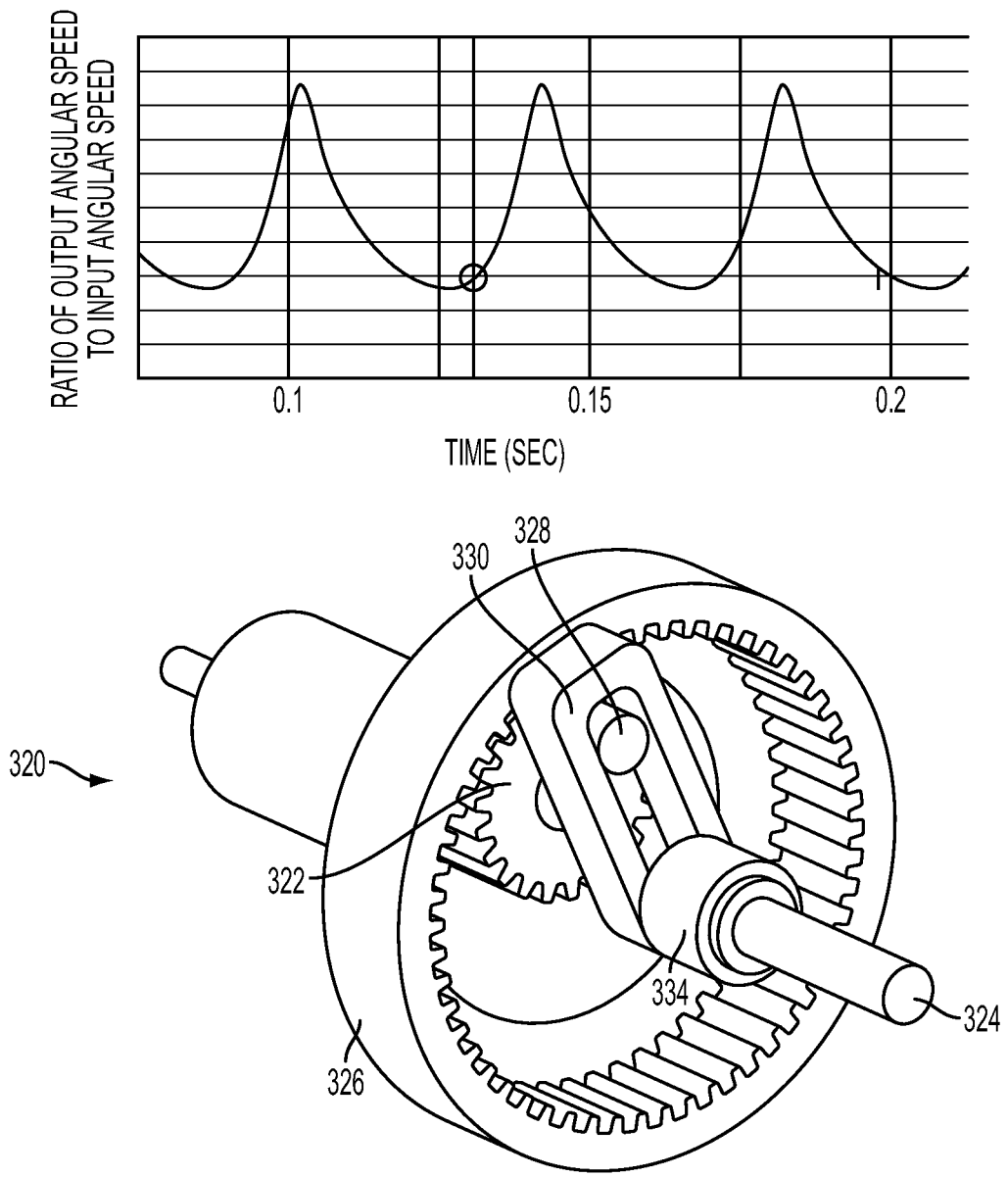
FIGS. 14A-14D are perspective views of an embodiment of a variable speed gear set for use with the transmission of FIG. 13A.
Figure 14B:
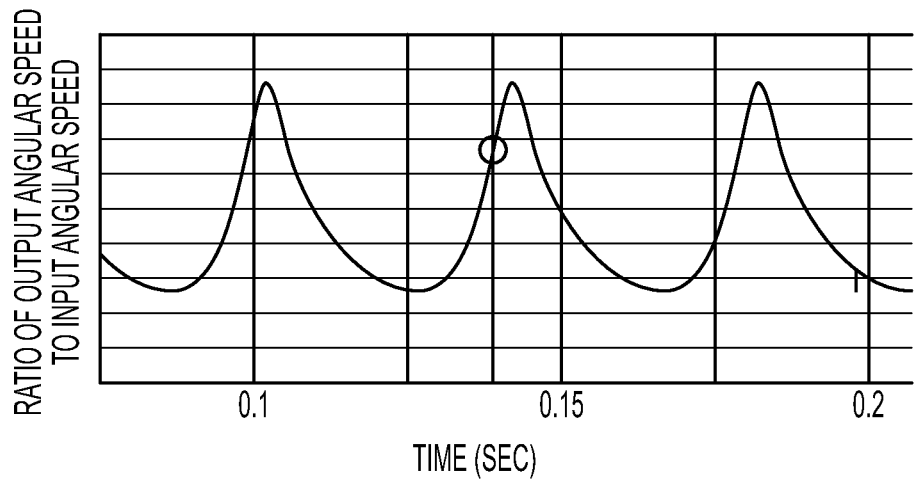
Figure 14B:
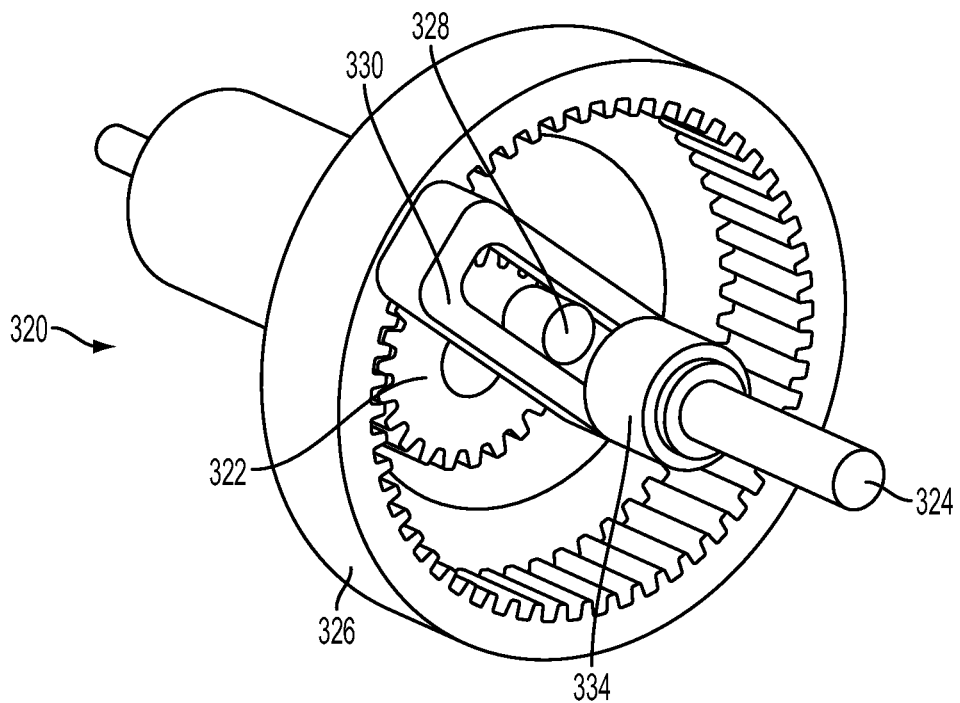
Figure 14C:
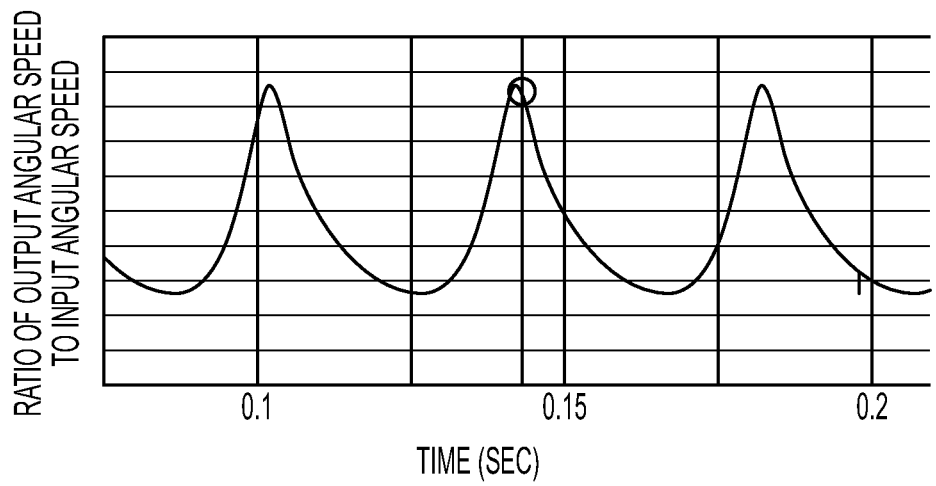
Figure 14C:
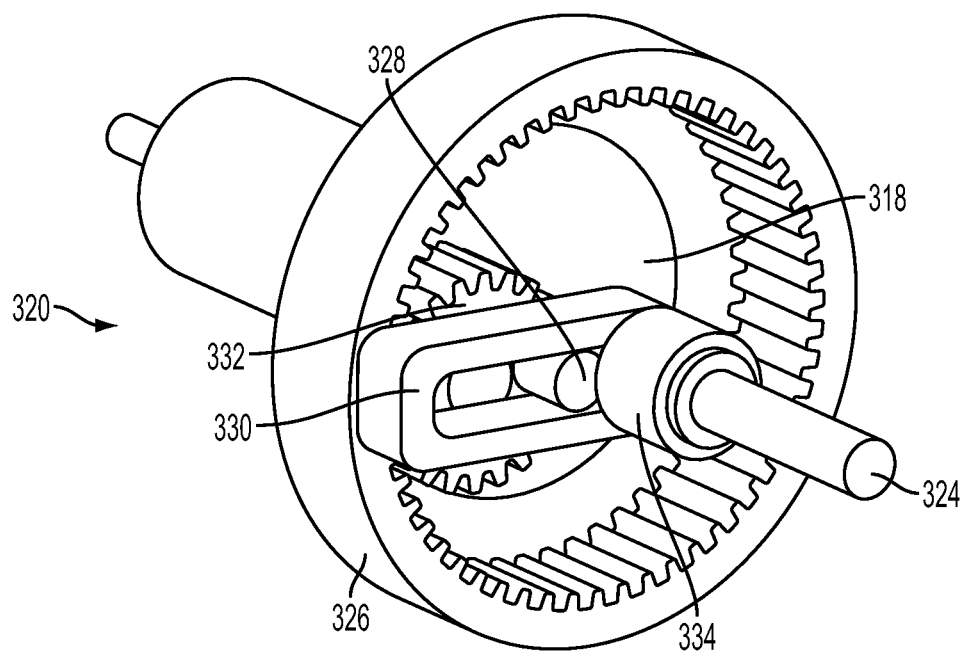
Figure 14D:
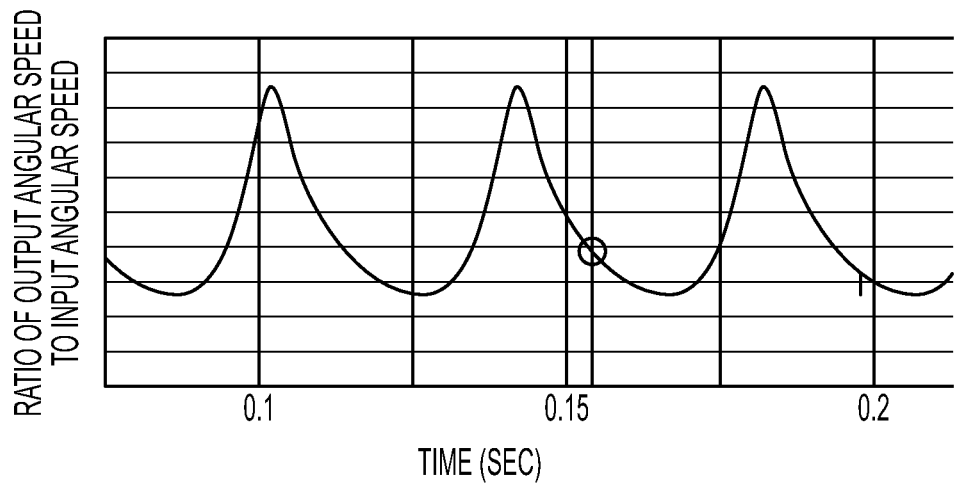
Figure 14D:
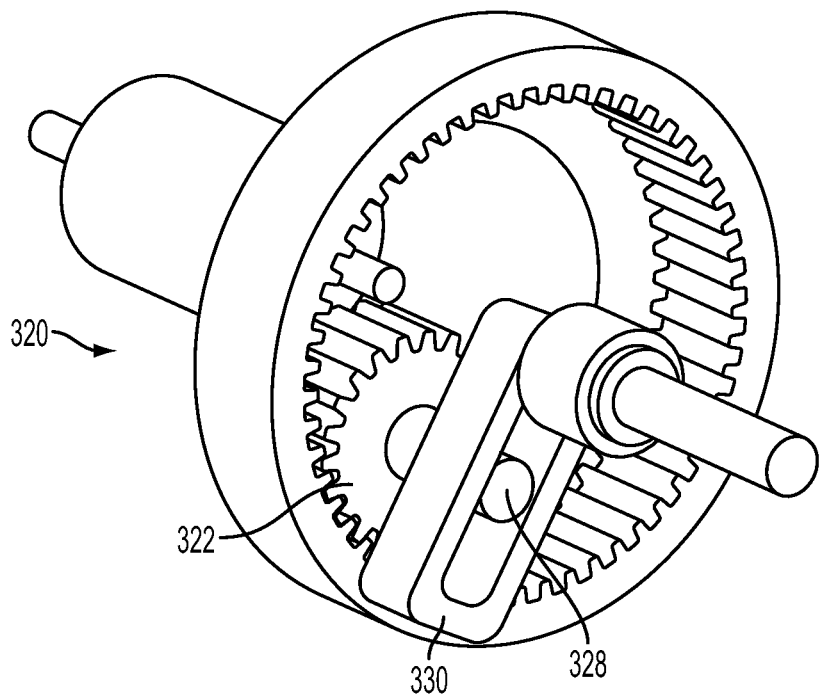
Figure 14E:
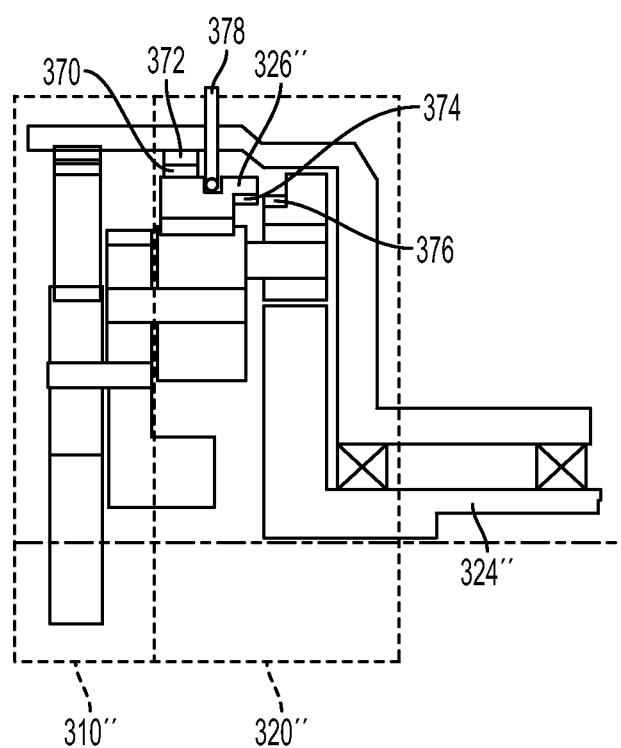
FIG. 14E is a is a schematic diagram of a manually shiftable transmission that includes a constant speed ratio gear set and the variable speed ratio gear set of FIGS. 14A-14D.

In alternative embodiments, the transmission can be manually shifted between the first (constant) speed ratio mode of operation and the second (variable) speed ratio mode of operation. For example, as shown in FIG. 14E, the transmission can include a first planetary gear set 310" that is substantially the same as the first gear set 310, and a second gear set 320" that is substantially the same as the second gear set 320, except that the ring gear 326" is axially shiftable between a rearward position (shown in FIG. 14E) where the ring gear 326" is engaged to the housing, and a forward position (not shown) where the ring gear 326" is engaged to the output spindle 324". The ring gear 326" has a first set of splines 370 that engage corresponding splines 372 on the housing when the ring gear 326" is in the rearward position, and a second set of splines 374 that engage corresponding splines 376 on a large diameter portion of the spindle 324" when the ring gear 326" is in the forward position. Coupled to the ring gear 326" is a shift wire 378 that is connected to an external switch (not shown) so that the user can manually move the ring gear 326" between the rearward and forward positions. When the ring gear 324" is in the rearward position, it is ground to the housing so that the second gear set 320 is active, causing variable speed ratio rotation of the output spindle. When the ring gear 324" is in the forward position, it transmits torque directly from the first gear set 310" to the output spindle, bypassing the second gear set 320", so that the output rotational speed is at a constant ratio. Other manual shifting mechanisms could also be used, such as adding a shifting ring around the outside of the ring gears to alternately lock or unlock the ring gears 326" to the housing, or by shifting another gear of the second gear set 320" into or out of the engagement with the other gears of the second gear set.

Figure 15:
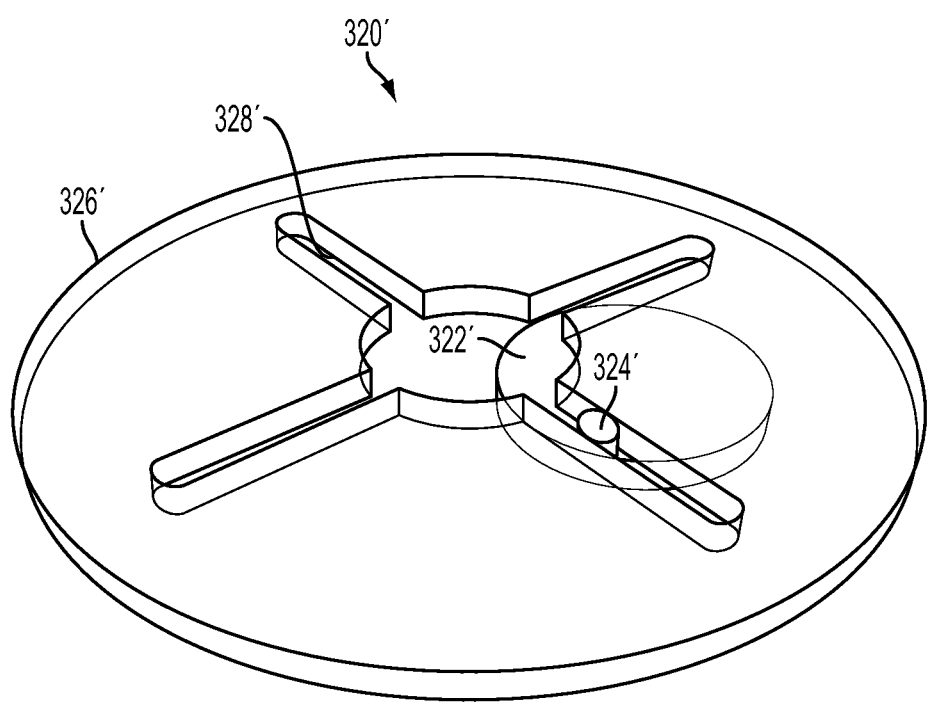
FIG. 15 is a perspective view of another embodiment of a variable speed ratio gear set for use with the transmission of FIG. 13A.

The second gear set 320 described above provides for a variable speed ratio, but with a continuous motion of the output shaft. Referring to FIG. 15, in an alternative embodiment, the second gear set 320 can be replaced with a second gear set 320' that provides a variable speed ratio output with a punctuated, discontinuous output motion. The second gear set 320' is a Geneva gear set that includes a round Geneva input gear 322' with an eccentric pin 324', and a round Geneva output gear 326' with a plurality of radial slots 328' that receive the eccentric pin 324'. For each rotation of the input Geneva gear 322', the pin 324' engages one of the slots 328', causing the output gear to rotate by approximately 90 degrees. It should be understood that the amount or frequency of rotation of the output gear relative to the input gear can be varied by varying the number of slots or eccentric pins. Thus, the Geneva gear set 320' provides for a variable speed ratio between the output speed and in the input speed, transmitting power in punctuated discontinuous motion. It should be understood that other Geneva gear sets can be used instead of the illustrated Geneva gear set.

Figure 16A:
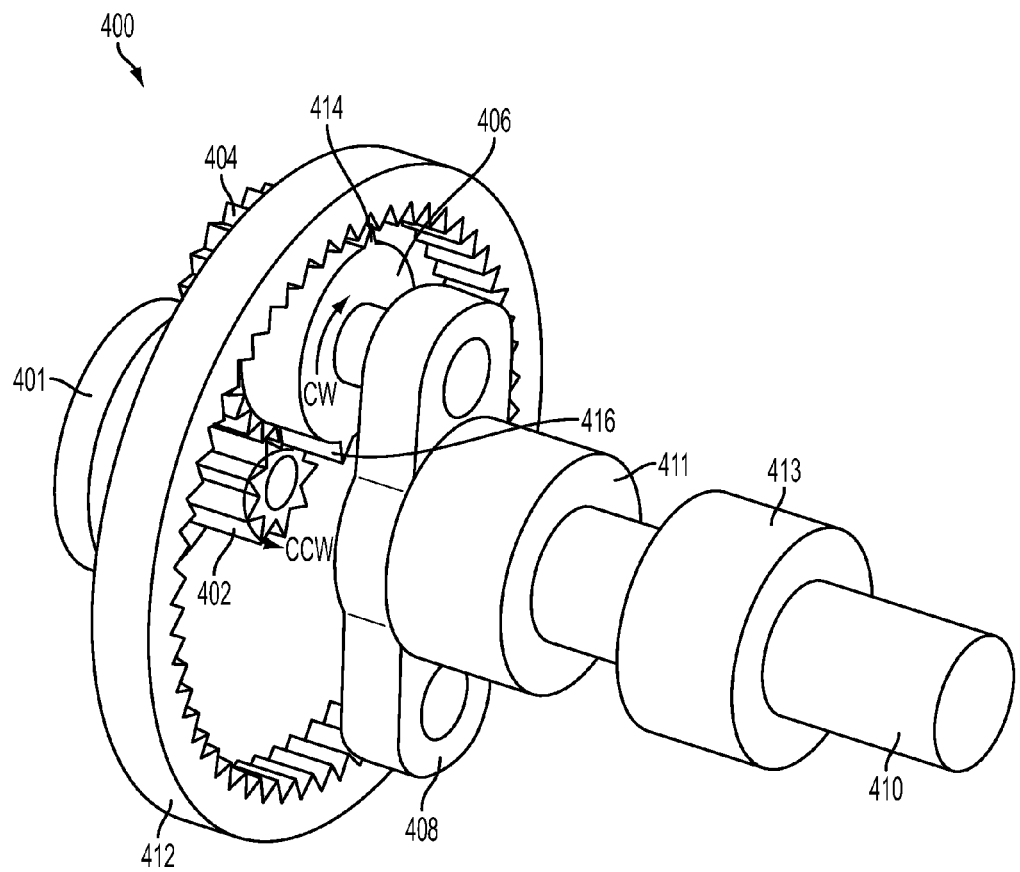
FIGS. 16A and 16B are perspective views of another embodiment of a variable speed ratio gear set for use with the transmission of FIG. 13A.
Figure 16B:
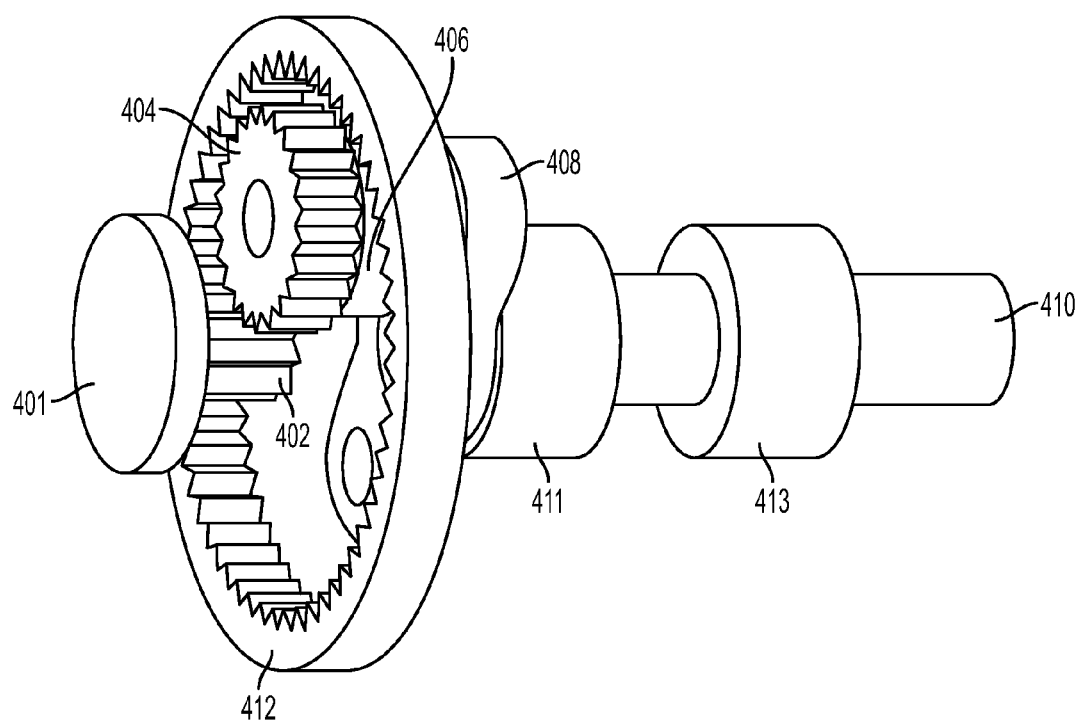

Referring to FIGS. 16A and 16B, in another alternative embodiment, the second gear set 320 could be replaced with a second gear set 400 that also provides a variable speed ratio output with a punctuated, discontinuous output motion. The second gear set 400 receives an input from the motor or another portion of the transmission (indicated at 401) and includes in input sun gear 402, and an input planet gear 404 that meshes with the sun gear 402. The input planet gear 404 is non-rotationally coupled to an output planet gear 406 so that the input planet gear 404 and the output planet gear 406 rotate together as a unit. The input planet gear 404 and the output planet gear 406 each are pinned to an output carrier 408, which in turn is non-rotationally coupled to an output shaft 410 (which is substantially the same as the above-described output shaft 324). The output carrier 408 and output shaft 410 rotate together as a unit. The output shaft 410 is supported by bearings 411 and 413. Surrounding the output planet gear 406 is a stationary ring gear 412 that is fixed to the tool housing. The output planet gear 406 has a reduced number of teeth, in this case only a first tooth 414 and a second tooth 416 located diametrically opposed to one another on the output planet gear 406.

Figure 17A:
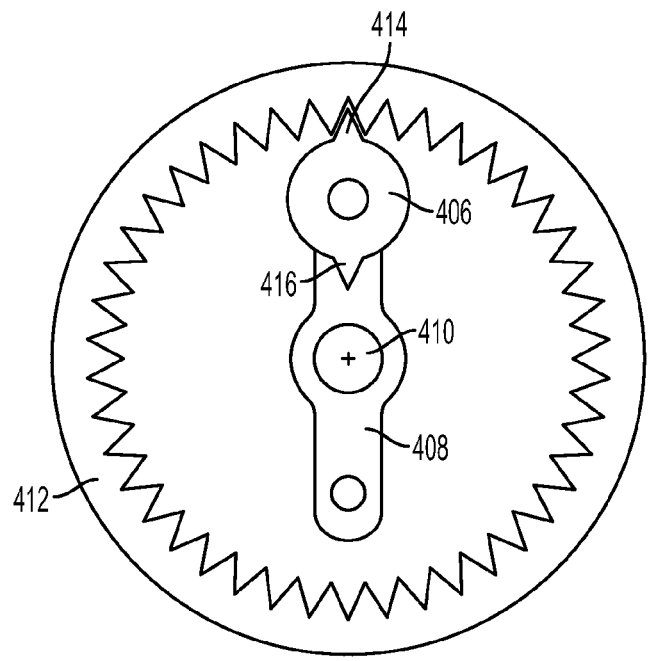
FIGS. 17A-17E are schematic views showing operation of the variable speed gear set of FIGS. 16A and 16B.
Figure 17B:
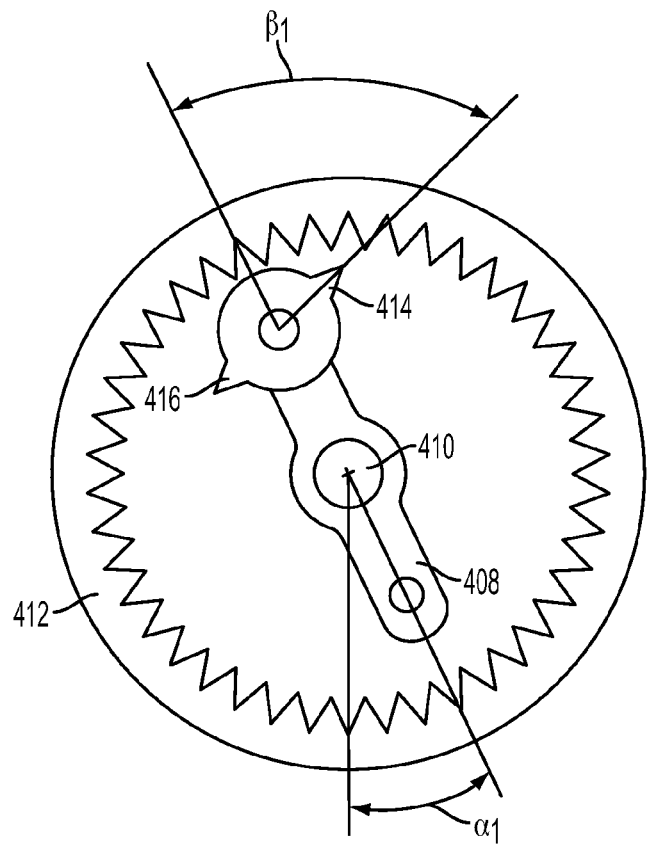
Figure 17C:
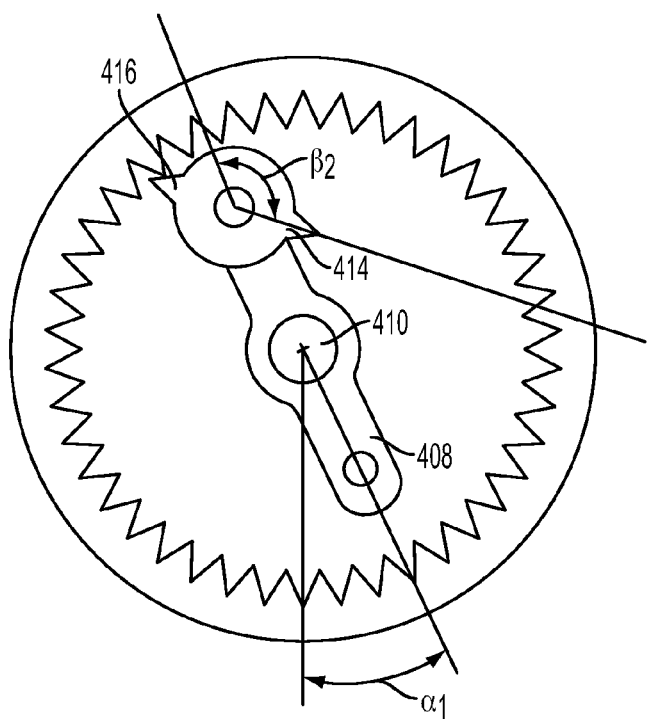
Figure 17D:
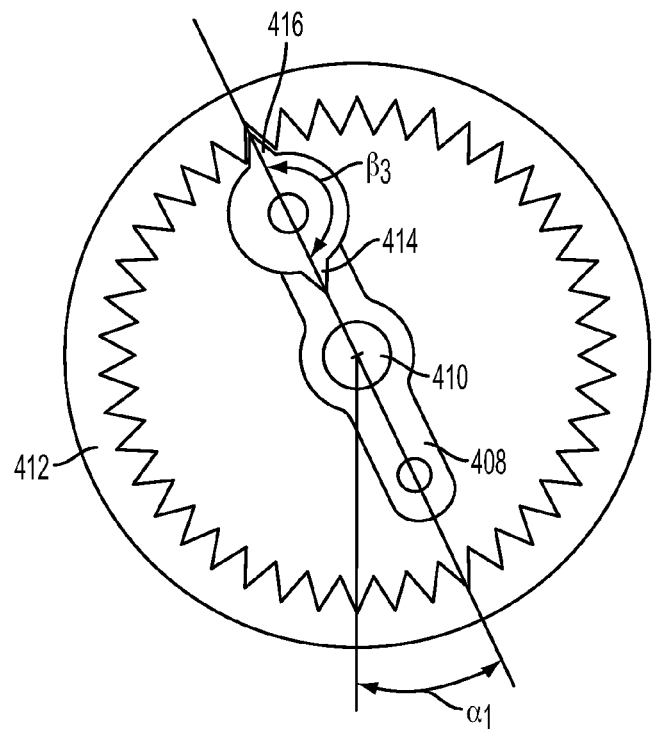
Figure 17E:
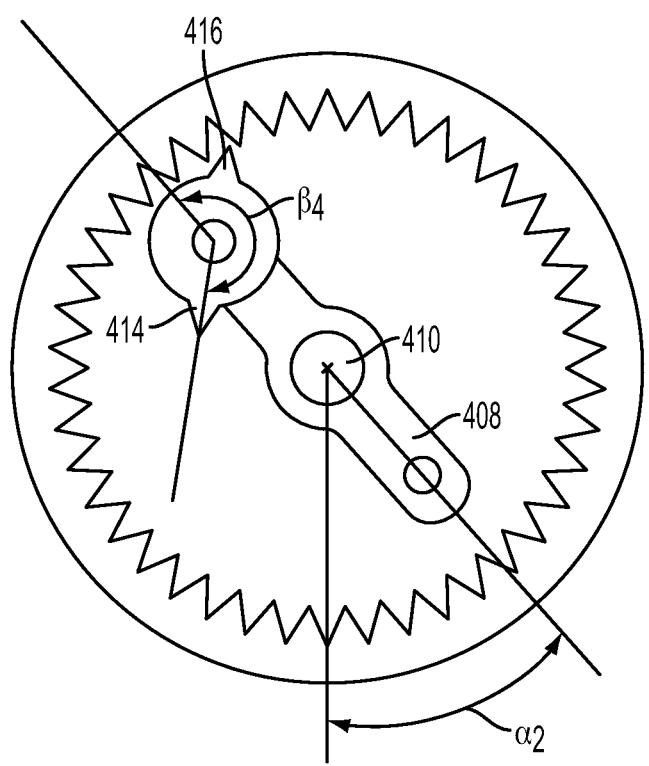

Referring also to the schematic diagrams of FIGS. 17A-17E, in use, the input sun gear 402 rotates continuously in a counterclockwise direction CCW causing the input planet gear 404 and the output planet gear 406 to continuously rotate about their center axes in a clockwise direction CW. Because the output planet gear 406 has a reduced number of teeth, the output carrier intermittently rotates in the counterclockwise direction CCW only when one of the teeth of the output planet gear 406 engages the teeth on the ring gear 412. As shown in FIG. 17A, in an initial position, the first tooth 414 of the output planet gear is engaged with a tooth on the ring gear 412. In FIG. 17B, the output planet gear 406 has rotated clockwise by an angle β1 (e.g., approximately 60°) from its initial position, causing the carrier 408 to rotate counterclockwise by an angle α1 (e.g., approximately 30°) from its initial position. Referring to FIG. 17C, the output planet gear 406 continues to rotate through an angle β2 (e.g., approximately 120°). Because no tooth is engaging the ring gear, the carrier 408 remains substantially stationary. Referring to FIG. 17D, the carrier 408 continues to remain stationary until the output planet gear 406 has rotated by an angle β3 (e.g., approximately 120°) and the second tooth 416 comes into engagement with the ring gear 412. Referring to FIG. 17E, the output planet gear 406 continues to rotate by an angle β4 (e.g., approximately 240°), and the second tooth kicks the carrier 408 so that it rotates to an angle α2 (e.g., approximately 60°) from its initial position. The carrier 408 will then remain substantially stationary until the first tooth 414 engages the ring gear 412, at which point the carrier 408 will again rotate, and so forth.

Thus, the output speed of the output shaft 410 is at a variable speed ratio relative to the input speed of the input 401. For example, as the input sun gear 402, input planet gear 404, and output planet gear 406 rotate at a substantially constant speed, the output planet gear 414 and output shaft 410 rotate at a variable speed with a discontinuous stopping and starting motion. It should be understood that the variable speed ratio and/or the rate of discontinuous movements of the output shaft 410 can be modified, for example, to have a greater number of input and/or output planet gears, and by modifying the number and/or spacing of the teeth on the output planet gear, to achieve the desired movement of the output shaft.

In still other embodiments, the second gear set 320 can be replaced by non-circular gears, such as the triangular or elliptical gears, as described above.

Numerous other modifications may be made to the exemplary implementations described above. These and other implementations are within the scope of the following claims.

What is claimed is:

1. A power tool comprising:
   a housing;
   a motor contained in the housing;
   an output shaft extending proximate a front of the housing;
   an end effector coupled to the output shaft, the end effector configured to hold an accessory; and
   a transmission disposed in the housing between the motor and the output shaft, the transmission including a variable ratio gear set and a constant ratio gear set, wherein
   the variable ratio gear set is configured to transmit power from the motor to the output shaft via a first power path such that, when power is transmitted through the variable ratio gear set, a ratio of an output speed of the output shaft to an input speed of the motor varies while transmitting power through the first power path,
   the constant ratio gear set is configured to transmit power from the motor to the output shaft via a second power path at a substantially constant speed ratio, and
   the transmission is selectively operable in: (a) a first mode where power is transmitted from the motor to the output shaft through the constant ratio gear set via the second power path, bypassing the variable ratio gear set, at the substantially constant speed ratio; or (b) a second mode where power is transmitted from the motor to the output shaft through the variable ratio gear set via the first power path.

2. The power tool of claim 1, wherein the constant ratio gear set comprises circular gears.

3. The power tool of claim 2, wherein the circular gears comprise a first circular gear that receives rotational output of the motor and a second circular gear rotationally driving the output shaft, the first circular gear meshing with the second circular gear.

4. The power tool of claim 2, wherein the circular gears comprise a planetary gear set with a sun gear that receives rotational output of the motor, a planet gear that orbits the sun gear, a stationary ring gear surrounding the planet gear, and a carrier that carries the planet gear and that rotationally drives the output shaft.

5. The power tool of claim 1, wherein the variable ratio gear set comprises a Geneva gear set.

6. The power tool of claim 1, wherein the variable ratio gear set comprises non-circular gears.

7. The power tool of claim 1, wherein the variable ratio gear set comprises a carrier that receives rotational output of the motor, a planet gear coupled to the carrier, a stationary ring gear surrounding the planet gear, an eccentric pin coupled to the planet gear, and a radial yoke that receives the pin for radial movement relative to the yoke, the yoke rotationally driving the output shaft, such that when the carrier rotates on its axis, the planet gear moves in an orbital motion and rotates about its axis while the eccentric pin moves radially back and forth in the yoke, causing the yoke to rotate such that a ratio of an output speed of the yoke to an input speed of the carrier varies as the carrier rotates.

8. The power tool of claim 1, wherein the variable ratio gear set comprises a sun gear that receives rotational output of the motor, an input planet gear meshed with the sun gear, an output planet gear rotationally driven by the input planet gear, a carrier that carries the output planet gear and that to rotationally drives the output shaft, and a stationary ring gear, wherein the output planet gear has a reduced number of teeth that engage the ring gear, such that constant rotational motion of the sun gear causes constant rotational motion of the input planet gear and the output planet gear, which causes intermittent rotational motion of the carrier.

9. The power tool of claim 1, wherein in the second mode power transmitted from the motor to the output shaft bypasses the constant ratio gear set.

10. The power tool of claim 1, wherein the transmission is automatically shiftable between the first mode and the second mode.

11. The power tool of claim 10 further comprising splines on the output shaft, the output shaft moveable axially between a first position in the first mode where at least a portion of the splines rotationally connect the constant ratio gear set to the output shaft and the splines do not rotationally connect the variable ratio gear set to the output shaft, and a second position in the second mode where at least a portion of the splines rotationally connect the variable ratio gear set to the output shaft and the splines do not rotationally connect the constant ratio gear set to the output shaft, the output shaft being biased toward the first position and automatically shifting axially to the second position when output torque exceeds a predetermined value.

12. The power tool of claim 1, wherein the transmission is manually shiftable by a user between the first mode and the second mode.

13. The power tool of claim 12, further comprising a shifting element that shifts at least one component of the constant ratio gear set between an active position in the first mode and an inactive position in the second mode, or shifts at least one component of the variable ratio gear set between an active position in the second mode and an inactive position in the first mode.

14. A power tool, comprising:
a housing;
a motor contained in the housing;
an input shaft rotationally driven by the motor;
an output shaft;
an end effector coupled to the output shaft, the end effector configured to hold an accessory; and
a variable ratio gear set comprising: (a) a carrier rotationally driven by the input shaft; (b) a planet gear rotationally coupled to the carrier, the planetary gear having external teeth and an axially extending eccentric pin; (c) a stationary ring gear generally surrounding the planetary gear, having internal teeth that mesh with the external teeth of the planet gear; and (d) a yoke rotationally driving and extending radially outward from the output shaft, the yoke receiving the eccentric pin,
wherein when the input shaft rotates, the planet carrier rotates, and the planet gear moves in an orbital motion and rotates about its axis, and the eccentric pin moves radially back and forth in the yoke, causing the yoke and the output shaft to rotate at a variable speed ratio relative to the speed of the input shaft.

15. The power tool of claim 14, further comprising a constant ratio gear set configured to transmit power from the input shaft to the output shaft at a constant speed ratio, wherein transmission is operable in a first mode where power is transmitted from the input shaft to the output shaft via the variable ratio gear set along a first power path, and a second mode where power is transmitted from the input shaft to the output shaft via the constant ratio gear set along a second power path.

16. A power tool comprising:
a housing;
a motor contained in the housing;
an output shaft extending proximate a front of the housing;
an end effector coupled to the output shaft, the end effector configured to hold an accessory; and
a transmission disposed in the housing between the motor and the output shaft, the transmission including a variable ratio gear set and a constant ratio gear set, wherein
the variable ratio gear set is configured to transmit power from the motor to the output shaft such that, when power is transmitted through the variable ratio gear set, a ratio of an output speed of the output shaft to an input speed of the motor varies between a high value and a low value according to a predetermined periodic cycle,
the constant ratio gear set is configured to transmit power from the motor to the output shaft at a substantially constant speed ratio, and
the transmission is selectively operable in a first mode where power is transmitted from the motor to the output shaft via the variable ratio gear set along a first power path, and a second mode where power is transmitted from the motor to the output shaft via the constant ratio gear set along a second power path.

17. The transmission of claim 16, wherein the low value is a non-zero value.

* * * * *